United States Patent
Gao et al.

(10) Patent No.: US 9,596,770 B2
(45) Date of Patent: Mar. 14, 2017

(54) ELECTRONIC DEVICE

(71) Applicant: Lenovo (Beijing) Co., Ltd., Beijing (CN)

(72) Inventors: Zhijun Gao, Beijing (CN); Shipeng Zhang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 39 days.

(21) Appl. No.: 14/840,344

(22) Filed: Aug. 31, 2015

(65) Prior Publication Data
US 2016/0374212 A1     Dec. 22, 2016

(30) Foreign Application Priority Data
Jun. 19, 2015   (CN) .......................... 2015 1 0345901

(51) Int. Cl.
*H05K 5/00*     (2006.01)
*H04N 5/232*   (2006.01)
*H01R 35/04*   (2006.01)

(52) U.S. Cl.
CPC ........... *H05K 5/0017* (2013.01); *H01R 35/04* (2013.01)

(58) Field of Classification Search
None
See application file for complete search history.

(56) References Cited

U.S. PATENT DOCUMENTS

| | | | | |
|---|---|---|---|---|
| 7,782,375 B2 * | 8/2010 | Chambers | ............... | H04N 7/142 348/239 |
| 7,967,513 B2 * | 6/2011 | Zhang | .................... | G02B 7/182 396/351 |
| 8,077,860 B2 * | 12/2011 | Lin | ........................ | G06F 1/1632 379/428.01 |
| 8,478,366 B2 * | 7/2013 | Shin | .................... | H04M 1/0241 353/119 |
| 8,760,569 B2 * | 6/2014 | Yang | .................... | G06F 1/1632 348/373 |
| 9,294,659 B1 * | 3/2016 | Bednarik | ............. | H04N 5/2254 |
| 9,392,156 B2 * | 7/2016 | Wang | .................... | H04N 5/2256 |
| 9,423,671 B2 * | 8/2016 | O'Neill | ................. | G03B 15/06 |
| 9,454,066 B2 * | 9/2016 | O'Neill | ................. | G03B 17/565 |
| 9,503,625 B2 * | 11/2016 | Saitoh | .................... | H04N 5/232 |
| 2002/0160724 A1 * | 10/2002 | Arai | ........................ | H04N 7/142 455/575.1 |
| 2004/0095500 A1 * | 5/2004 | Sato | .................... | H04N 1/00307 348/340 |
| 2006/0014563 A1 * | 1/2006 | Cheng | ................. | H04M 1/0254 455/557 |
| 2007/0280677 A1 * | 12/2007 | Drake | ........................ | G02B 7/02 396/429 |
| 2008/0273112 A1 * | 11/2008 | Sladen | ................ | H04M 1/0218 348/370 |

(Continued)

*Primary Examiner* — Xanthia C Cunningham
(74) *Attorney, Agent, or Firm* — Brinks Gilson & Lione; G. Peter Nichols (57) ABSTRACT

An electronic device is described that includes a first body; a second body; and a connection member through which the first body is connected with the second body. The connection member includes a rotary connection part for supporting the first body to rotate around an axis line of the rotary connection part and an extensible connection part for supporting the first body to be close to or away from the second body.

16 Claims, 5 Drawing Sheets

(56) References Cited

U.S. PATENT DOCUMENTS

| | | | | |
|---|---|---|---|---|
| 2012/0270599 A1* | 10/2012 | Mori | ............... | H04M 1/72527 455/556.1 |
| 2013/0038697 A1* | 2/2013 | Chen | ............... | G03B 35/10 348/47 |
| 2013/0178245 A1* | 7/2013 | Kulas | ............... | H04M 1/0254 455/556.1 |
| 2013/0206614 A1* | 8/2013 | O'Neill | ............... | H04B 1/3888 206/216 |
| 2013/0240578 A1* | 9/2013 | Yu | ............... | H04B 1/385 224/197 |
| 2013/0331148 A1* | 12/2013 | Brough | ............... | G06F 1/1632 455/557 |
| 2014/0171150 A1* | 6/2014 | Hurst | ............... | H04M 1/0264 455/556.1 |
| 2015/0180527 A1* | 6/2015 | Fathollahi | ............... | H04B 1/3888 455/575.8 |

* cited by examiner

ELECTRONIC DEVICE

This application claims priority to Chinese patent application No. 201510345901.9 filed on Jun. 19, 2015, the entire contents of which are incorporated herein by reference.

The present application relates to the field of electronic devices, and more particularly, to an electronic device.

BACKGROUND

With the development of electronic devices, currently, an electronic device comprising two parts that are relatively rotatable appears on the market. One or more functional units are provided on the two parts each. In specific applications, it is discovered that mutual interference is caused by that the two parts are closely adjacent, which affects use satisfaction of users, effect of functions achieved by some functional units also is greatly reduced.

SUMMARY

The embodiments of the present application provide an electronic device, comprising:
a first body;
a second body; and
a connection member through which the first body is connected with the second body; the connection member comprising a rotary connection part for supporting the first body to rotate around an axis line of the rotary connection part and an extensible connection part for supporting the first body to be close to or away from the second body.

Optionally, the connection member comprises a first flexible shaft;
the first flexible shaft is operative, through deformation, to enable the first body to rotate in a first plane parallel to an end surface of the second body, and change a distance between the first body and the second body.

Optionally, the connection member comprises a T-shaped rotary shaft;
the T-shaped rotary shaft comprises a second flexible shaft perpendicular to an end surface of the second body and a first rotary shaft parallel to the end surface of the second body;
the second flexible shaft is operative, through deformation, to enable the first body to rotate in a first plane parallel to the end surface of the second body, and change a distance between the first body and the second body;
the first rotary shaft is operative to enable the first body to rotate in a second plane perpendicular to the end surface of the second body.

Optionally, the connection member comprises an I-shaped rotary shaft;
the I-shaped rotary shaft comprises a third flexible shaft perpendicular to an end surface of the second body, and a second rotary shaft and a third rotary shaft parallel to the end surface of the second body; the second rotary shaft is movably connected with the first body; the third rotary shaft is movably connected with the second body;
the third flexible shaft is operative, through deformation, to enable the first body to rotate in a first plane parallel to an end surface of the second body, and change a distance between the first body and the second body;
the second rotary shaft is operative to enable the first body to rotate in a second plane;
the third rotary shaft is operative to enable the second body to rotate in the second plane;
the first plane is perpendicular to the second plane.

Optionally, the connection member comprises an extensible rotary shaft;
the extensible rotary shaft comprises at least N sleeves; N being an integer not less than 2;
an outer diameter of an n-th sleeve is not greater than an inner diameter of an (n+1)-th sleeve; the n-th sleeve can be located within the (n+1)-th sleeve each; n being an integer not less than 1 but less than N;
when a distance between the first body and the second body increases, at least a portion of an m-th sleeve is located outside an (m+1)-th sleeve; m being an integer not less than 1 but less than N.

Based on the aforesaid solution, a damping member is provided at a position where the connection member contacts the first body;
the damping member is for maintaining a relative stabilization of the first body and the second body when an external force applied to the connection member is removed.

Optionally, each of the sleeves comprises two conductive rings and a conductive path thereon; the two conductive rings are located at two ends of the sleeve; the conductive path connects the two conductive rings;
the conductive rings and the conductive path all are configured to transmit electrical signals between the first body and the second body.

Optionally, an image acquisition unit is provided on the first body;
a display unit is provided on the second body.

Optionally, the electronic device further comprises a control unit for controlling a gesture or movement state of the connection member, so as to control a position of the first body and/or that of the second body.

Optionally, the electronic device further comprises a detection unit for detecting the gesture or movement state of the connection member;
the control unit is configured to control the electronic device to perform a functional operation corresponding to the gesture or movement state of the connection member.

Optionally, the electronic device further comprises an elastic member formed with a pre-compression;
the pre-compression is configured to provide a drive force for the first body to be away from the second body, so that the distance between the first body and the second body is operative to change between a first distance and a second distance; the first distance being less than the second distance.

Optionally, a circumferential edge of the end surface of the second body forms an outer frame along a direction away from the end surface;
a height of the outer frame is not less than that of the elastic member after the pre-compression is formed.

DETAILED DESCRIPTION

Hereinafter, the technical solutions of the present application will be further described in detail with reference to the accompanying drawings and the specific embodiments.

First Device Embodiment

Figure 1:
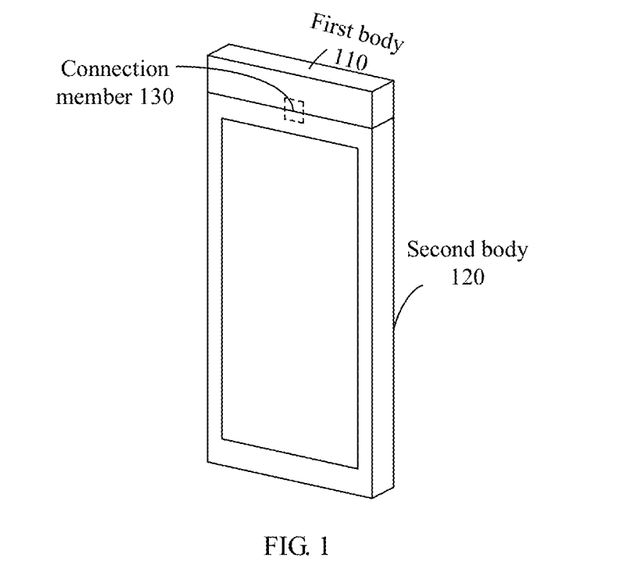
FIG. 1 is a first structural schematic diagram of the electronic device according to an embodiment of the present application.

As shown in FIG. 1, this embodiment provides an electronic device, comprising:
a first body 110;
a second body 120; and
a connection member 130 through which the first body 110 is connected with the second body 120; the connection member 130 comprising a rotary connection part for supporting the first body 110 to rotate around an axis line of the rotary connection part and an extensible connection part for supporting the first body 110 to be close to or away from the second body 120.

The electronic device in this embodiment may be a mobile phone, a tablet computer, an e-book, or other electronic devices; optionally, it is a portable mobile terminal.

Functional units are provided within both the first body 110 and the second body 120; usually, the first body 110 is removable relative to the second body 120, typically, a volume of the first body 110 may be less than that of the second body 120, the second body 120 may serve as a main body part, and the first body 110 may serve as a movement part.

The functional units may comprise an image acquisition unit, which may comprise a camera arrangement. Arrangements like a power supply unit and a display unit may be provided within the second body 120.

The connection member can achieve the function of connecting the first body 110 and the second body 120, and can enable the first body 110 to move relative to the second body 120.

A length of the first body 110 and that of the second body 120 may be equal in a first dimension; the first dimension may correspond to the longest edge of the first body 110; the first dimension may correspond to the second longest edge of the second body 120. Of course, the length of the first body 110 and that of the second body 120 may be also unequal in the first dimension.

The first body 110 and the second body 120 in this embodiment are connected with each other through the connection member 130. The connection member 130 not only can achieve the function of connecting the two, but also can enable the first body 110 to move relative to the second body 120.

Figure 2:
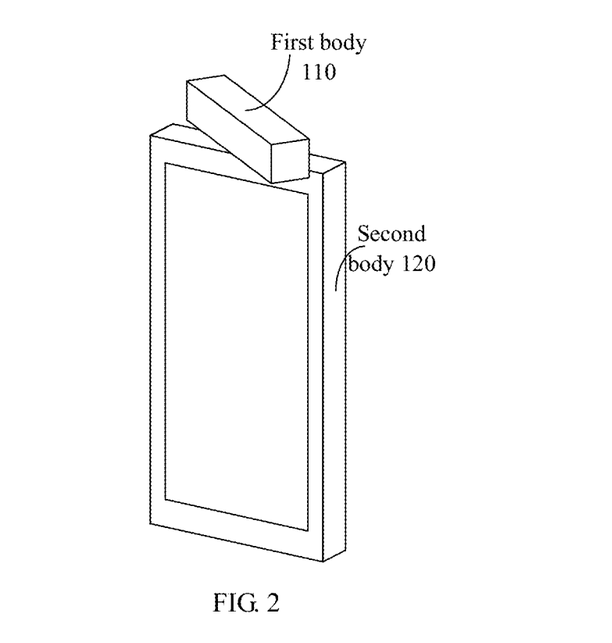
FIG. 2 is a second structural schematic diagram of the electronic device according to an embodiment of the present application.

FIG. 2 shows an effect schematic diagram after rotation is formed by that the first body 110 moves relative to the second body 120 under the action of the rotary connection part of the connection member 130. In this way, it causes the first body 110 and the second body 120 to form a cross in a plane which their adjacent sides reside, a butt area of the first body 110 and the second body 120 is changed by rotation.

Figure 3:
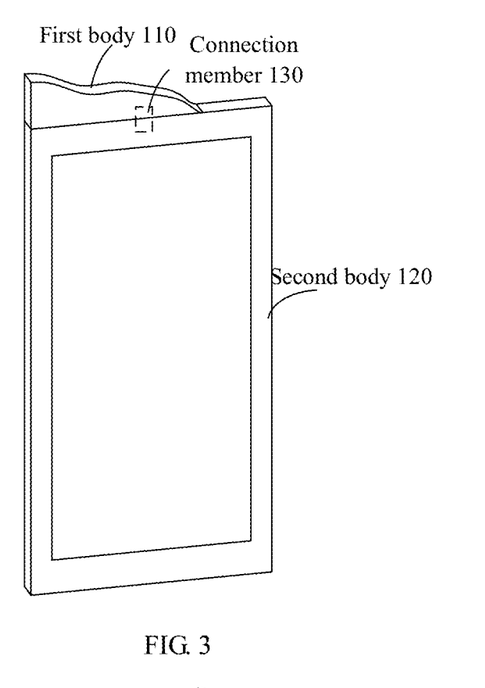
FIG. 3 is a third structural schematic diagram of the electronic device according to an embodiment of the present application.

The first body 110 and the second body 120 in FIGS. 1 and 2 both are strip cylindrical bodies that are more regular, of course, the two bodies may be other arrangements that are not regularly-shaped. As shown in FIG. 3, the first body 110 is a non-regularly-shaped columnar body.

Figure 4:
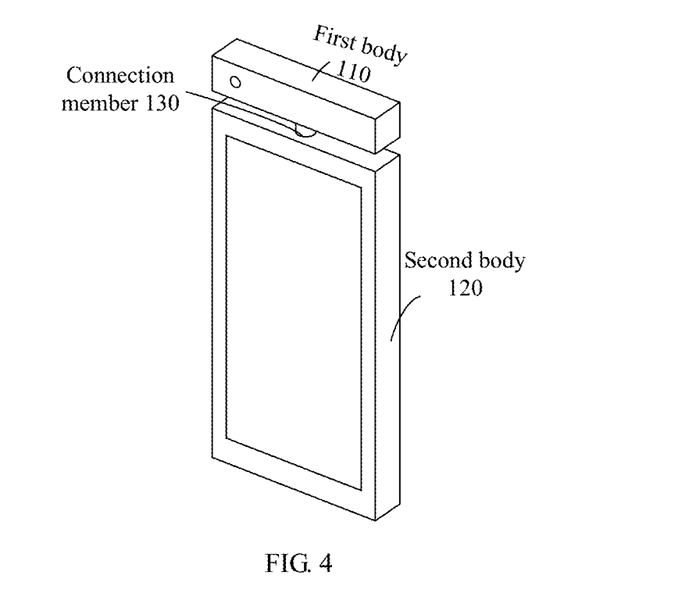
FIG. 4 is a fourth structural schematic diagram of the electronic device according to an embodiment of the present application.

FIG. 4 shows a schematic diagram that the first body 110 is away from the second body 120 under the action of the extensible connection part of the connection member 130. A distance between the first body 110 and the second body 120 in FIG. 1 is less than that between the first body 110 and the second body 120 in FIG. 4. In FIG. 1, the connection member 130 may be totally covered by the first body 110 and the second body 120, whereas in FIG. 4, through extension of the extensible connection part, the connection member 130 exposes a portion of itself in a gap between the first body 110 and the second body 120.

Obviously, the connection member 130 in this embodiment allows the first body 110 and the second body 120 to adjust the distance between them, so mutual interference due to close adjacency will not be caused. Specifically, for example, the first body 110 and the second body 120 need to rotate relative to the axis line of the connection member 130, if the first body 110 and the second body 120 are closely adjacent, the rotation may probably be not smooth, another example, an image acquisition unit is provided on the first body 110, an image is acquired by using the image acquisition unit, since the first body 110 and the second body 120 are closely adjacent, it may probably cause the image acquisition unit on the first body 110 to acquire the second body 120 to bring it into an acquired image, which thereby results in a problem of bad acquisition effect. If the electronic device in this embodiment is adopted, the distance between the first body 110 and the second body 120 may be adjusted by the extensible connection part of the connection member 130, then a perspective of the image acquisition unit can be lifted, which can lower the possibility of bringing the second body 120 into the acquired image, thereby reduce the interference between the first body 110 and the second body 120 and improve use satisfaction of users.

Second Device Embodiment

As shown in FIG. 1, this embodiment provides an electronic device, comprising:
a first body 110;
a second body 120; and
a connection member 130 through which the first body 110 is connected with the second body 120; the connection member 130 comprising a rotary connection part for supporting the first body 110 to rotate around an axis line of the rotary connection part and an extensible connection part for supporting the first body 110 to be close to or away from the second body 120.

The connection member 130 comprises a first flexible shaft;
the first flexible shaft is operative to, through deformation, enable the first body 110 to rotate in a first plane parallel to an end surface of the second body 120, and is operative to change a distance between the first body 110 and the second body 120.

The first flexible shaft may be made from flexible metal or flexible high polymer material. The first flexible shaft can be deformed under the action of an external force, and keep deformed caused by the external force when the external force is removed. In summary, the first flexible shaft in this embodiment may be made from material having a deformation capability and a weak capability of automatic deformation recovery. The weak capability of automatic deformation recovery may be understood as: potential energy is not saved because of deformation, so that no potential energy saved can automatically restore it to its original form.

For example, a user may make the first body 110 be away from the second body 120 by stretching the first flexible shaft, and the stretched distance between the first body 110 and the second body 120 is kept in the case that the force of the user is removed.

Another example, the user makes a relative position between the first body 110 and the second body 120 be switched from the state shown in FIG. 1 to the state shown in FIG. 2 by rotating the first flexible shaft, and the state shown in FIG. 2 is maintained after the user's rotating force is removed.

The end surface of the second body 120 in this embodiment is the surface at two ends of the second body 120, it may comprise an end surface closest to the first body 110 and an end surface farthest away from the first body 110.

The first plane is an end surface parallel to the second body 120, usually, the axis line of the connection member 130 is perpendicular to the first plane, i.e., the rotary connection part enables the first body 110 rotate to around the axis line of the rotary connection part may be considered that it enables the first body 110 to rotate in the first plane.

Of course, the first flexible shaft described in this embodiment concurrently serves as both the rotary connection part and the extensible connection part, features of simple structure and easy implementation are possessed.

Of course, since the first flexible shaft described in this embodiment is flexible, under the action of an external force, the first flexible shaft not only can be stretched and rotated in a plane perpendicular to the first plane, it may also be stretched in the first plane, in this way, a distance of a central position of the first body 110 and a central position of the second body 120 in the first plane may also be changed. As such, it may facilitate the user implementing adjustment of positional relationship of the first body 110 and the second body 120 in all directions by applying an external force in an associated direction to the first flexible shaft, according to requirements of application scenarios of the electronic device, features of broad scope of application scenarios and high adjustment flexibility are possessed.

It should be noted that: the first flexible shaft may be a hollow shaft, a hollow cavity is formed in internal of the shaft; an electric connection is provided within the hollow cavity for the first body 110 and the second body 120 to interchange signals. The electric connection may be a cord connection, it may also be metal cords, or other arrangements. The electrical signals here may comprise a pure energizing electrical signal, for example, a battery within the second body 120 provides electrical power to the functional units within the first body 110. The electrical signal may also be a signaling electrical signal, for example, information like an instruction transmitted by a main control unit within the second body 120 (the main control unit may comprise a central processing unit CPU), or other arrangements, to the functional units within the first body 110. Of course, the first flexible shaft may also be a solid shaft, the electric connection is exactly provided in the solid shaft.

Third Device Embodiment

As shown in FIG. 1, this embodiment provides an electronic device, comprising:

a first body 110;

a second body 120; and a connection member 130 through which the first body 110 is connected with the second body 120; the connection member 130 comprising a rotary connection part for supporting the first body 110 to rotate around an axis line of the rotary connection part and an extensible connection part for supporting the first body 110 to be close to or away from the second body 120.

Figure 5:
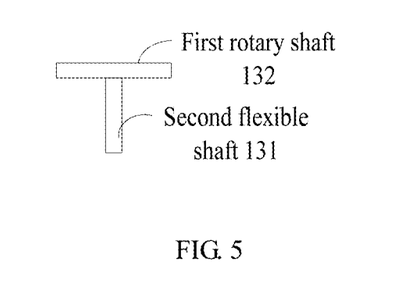
FIG. 5 is a first structural schematic diagram of the connection member according to an embodiment of the present application.
Figure 6:
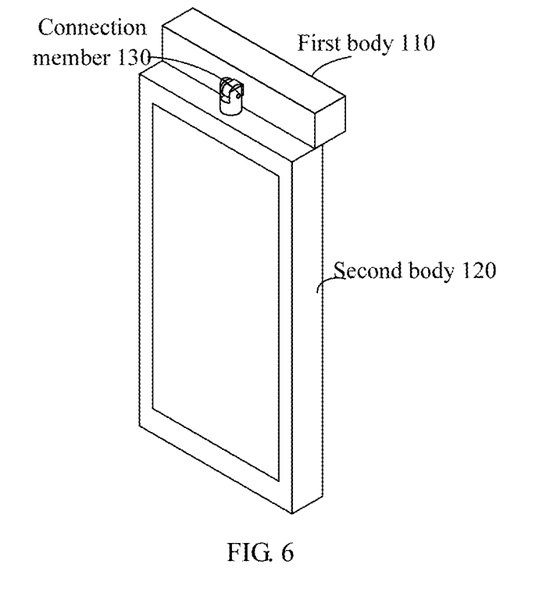
FIG. 6 is a fifth structural schematic diagram of the electronic device according to an embodiment of the present application.

As shown in FIG. 5, the connection member 130 comprises a T-shaped rotary shaft;

the T-shaped rotary shaft comprises a second flexible shaft 131 perpendicular to an end surface of the second body 120 and a first rotary shaft 132 parallel to the end surface of the second body 120;

the second flexible shaft 131 is operative to, through deformation, enable the first body 110 to rotate in a first plane parallel to the end surface of the second body 120, and is operative to change a distance between the first body 110 and the second body 120;

the first rotary shaft 132 is operative to enable the first body 110 to rotate in a second plane perpendicular to the end surface of the second body 120.

Properties of the second flexible shaft 131 in this embodiment are the same or like those of the first flexible shaft in the aforesaid embodiment, the second flexible shaft 131 can also be rotated, so as to enable the first body 110 and the second body 120 to rotate in the first plane, and the stretch of the second flexible shaft 131 is operative to change the distance between the first body 110 and the second body 120. Of course, the connection member 130 in this embodiment further comprises the first rotary shaft 132, the first rotary shaft 132 can operate the first body 110 to rotate within the second plane. The second plane may be a plane perpetual to the first plane; the second plane is perpendicular to the end surface of the second body 120; the end surface of the second body 120 may comprise a surface on which the connection member 130 is provided.

The first rotary shaft 131 described in this embodiment may be a rigid shaft whose movement enables the first body 110 to rotate in the second plane, it may also be a flexible shaft whose deformation enables the first body 110 to rotate in the second plane.

In summary, the electronic device described in this embodiment sets the connection member as the T-shaped rotary shaft, which improves movement space and movement capability of the first body 110 to the maximum, so that the electronic device is operative to change the relative positional relationship between the first body 110 and the second body 120 in different usage scenarios, meet usage requirements in specific usage scenarios, thereby enhance use satisfaction of the user.

Application scenarios of the electronic device described in this embodiment are extremely broad, a detailed example is provided below.

It is supposed that an image acquisition unit is provided on the first body 110. The image acquisition unit may comprise a camera or camcorder. During a usage, the first body 110 and the second body 120 may be made away from each other by the second flexible shaft 131, and then a surface where the image acquisition unit is provided of the first body 110 is made tilted to the ground by the rotary shaft 132, so that the user can hold the electronic device to make selfie. In this way, the connection member 130 also acts as a selfie stick, which obviously better facilitates operations of the user, in comparison to the electronic device having no connection member 130 provided therein in the art and making selfie with only a hand-holding manner.

Fourth Device Embodiment

As shown in FIG. 1, this embodiment provides an electronic device, comprising:

a first body 110;

a second body 120; and a connection member 130 through which the first body 110 is connected with the second body 120; the connection member 130 comprising a rotary connection part for supporting the first body 110 to rotate around an axis line of the rotary connection part and an extensible connection part for supporting the first body 110 to be close to or away from the second body 120.

Figure 7:
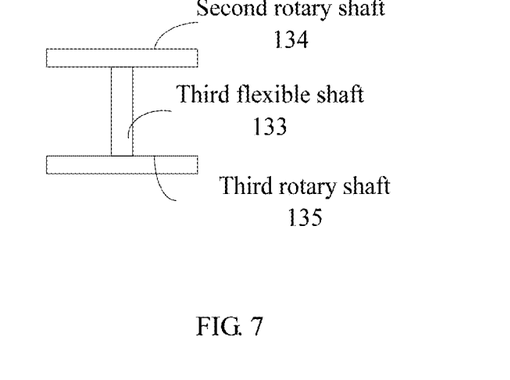
FIG. 7 is a second structural schematic diagram of the connection member according to an embodiment of the present application.

As shown in FIG. 7, the connection member 130 comprises an I-shaped rotary shaft;

the I-shaped rotary shaft comprises a third flexible shaft 133 perpendicular to an end surface of the second body 120, and a second rotary shaft 134 and a third rotary shaft 135 parallel to the end surface of the second body 120; the second rotary shaft 120 is movably connected with the first body 110; the third rotary shaft 135 is movably connected with the second body 120;

the third flexible shaft 133 is operative to, through deformation, enable the first body 110 to rotate in a first plane parallel to an end surface of the second body, and is operative to change a distance between the first body 110 and the second body 120;

the second rotary shaft 134 is operative to enable the first body 110 to rotate in a second plane;

the third rotary shaft 135 is operative to enable the second body 120 to rotate in the second plane; the first plane is perpendicular to the second plane.

Detailed descriptions of the third flexible shaft 133 are similar to those of the first flexible shaft in the aforesaid embodiment, no more repeat here. Structures and functions of the second rotary shaft 134 are similar to those of the aforesaid first rotary shaft 132, based on the aforesaid embodiment, this embodiment adds the third rotary shaft 135, so that the second body 120 may have a position change relative to the first body 110 through the movement of the second body 120.

Of course, the third rotary shaft 135 in this embodiment may also be a rigid shaft or a flexible shaft, it may be designed in particular as a rigid shaft or a flexible shaft as needed.

In this way, again, flexibility of changing the positional relationship between the first body 110 and the second body 120 within the electronic device is improved, which facilitates the electronic device being applied to more application scenarios, and improves application scenarios and use satisfaction of users once more.

Application scenarios of the electronic device described in this embodiment are quite broad, one specific application scenario is provided below. For example, the third flexible shaft 133 and the second rotary shaft 134 described in this embodiment may serve as a selfie stick pertaining to the electronic device, selfie is made through the stretch or rotation relationship. The process of making selfie may also involve inputting of user operations by clicking a display interactive screen of the electronic device to make selfie. When the height and angle of making selfie have already been determined through the third flexible shaft 133 and the second rotary shaft 134, but at this height and angle of making selfie, it is not convenient enough to input user operations. In this case, if the electronic device described in this embodiment is adopted, by adjusting the position of the second body 120 through the rotary shaft 135, it may make the user able to more conveniently touch the display interactive screen on the second body 120 in a more comfortable position, while maintaining the height and angle of making selfie.

In this embodiment, the second body 120 receives user operations; the user operations may directly act on the display interactive screen, or act on other members on the second body 120, such as various physical buttons on the second body 120.

Specifically, for example, the display interactive screen may comprise a bright screen state and a black screen state, in the bright screen state, the user can see a preview picture of a current selfie through the display interactive screen. In this embodiment, the electronic device may be triggered to perform an image acquisition through the black screen. Specifically, for example, a physical or virtual control button operated by the user is detected on the electronic device, an input of a user operation for triggering the display interactive screen to switch from the bright screen state and the black screen state is detected, while triggering a state switch of the display interactive screen, the image acquisition unit is also triggered to complete image acquisition, thus making selfie of the user.

Of course, application scenarios of the electronic device described in this embodiment are broad, not limited to the aforesaid example.

Fifth Device Embodiment

As shown in FIG. 1, this embodiment provides an electronic device, comprising:

a first body 110;

a second body 120; and a connection member 130 through which the first body 110 is connected with the second body 120; the connection member 130 comprising a rotary connection part for supporting the first body 110 to rotate around an axis line of the rotary connection part and an extensible connection part for supporting the first body 110 to be close to or away from the second body 120.

The connection member 130 comprises an extensible rotary shaft;

the extensible rotary shaft comprises at least N sleeves; N being an integer not less than 2;

an outer diameter of an n-th sleeve is not greater than an inner diameter of an (n+1)-th sleeve; the n-th sleeve can be located within the (n+1)-th sleeve each; n being an integer not less than 1 but less than N;

when a distance between the first body 110 and the second body increases 120, at least a portion of an m-th sleeve is located outside an (m+1)-th sleeve; m being an integer not less than 1 but less than N.

This embodiment provides an extensible rotary shaft composed of a plurality of sleeves, the extensible rotary shaft achieves extension of the connection member 130 through movement of the sleeves.

The extensible rotary shaft described in this embodiment may adopt a sleeve type extensible shaft. A hollow cavity may be provided in internal of the extensible rotary shaft; an electric connection may be provided within the hollow cavity for connecting the functional units in the first body 110 and the second body 120. Such electric connection may directly adopt conductive cable, of course, it may also be a conductive layer formed by a conductive metal, or other arrangements.

Figure 8:
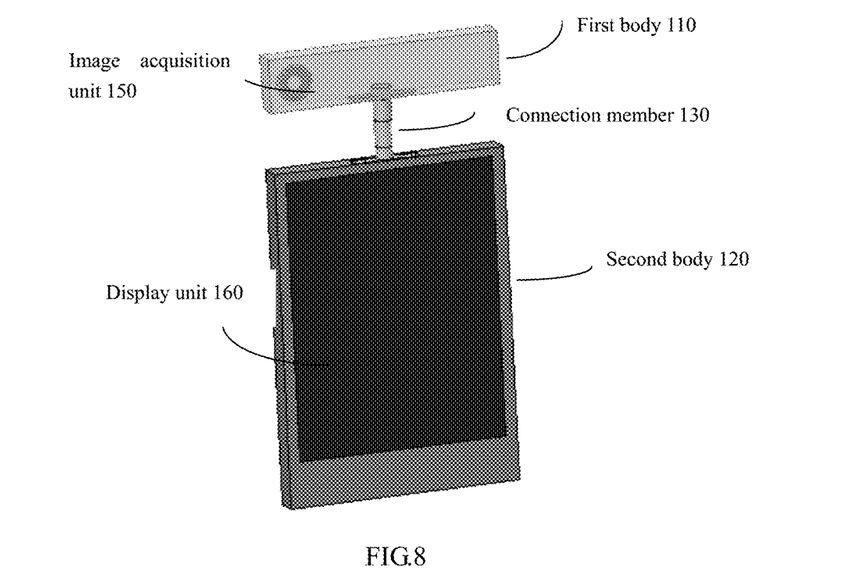
FIG. 8 is a sixth structural schematic diagram of the electronic device according to an embodiment of the present application.

FIG. 8 shows the connection member 130 in the electronic device that is formed by a plurality of connected sleeves. FIG. 8 shows that there are three sleeves.

In a specific implementation, further, there is a position defining arrangement between the sleeves, the position defining arrangement is for defining a maximum movement range between two adjacent sleeves. The position defining arrangement may be a latch point arrangement. For example, a retractable latch point may be set on one of the two adjacent sleeves, an opening or a convex hull is provided on the other of the two adjacent sleeves; two adjacent sleeves are locked when the latch point is located within the opening or the convex hull, and two adjacent sleeves can move mutually when the latch point is located outside the opening or the convex hull. In a specific implementation, for the aim of defining and stabilizing a position, a plurality of latch points may be provided within an end surface parallel to the second body 120, such as three or four latch points.

Of course, the position defining arrangement may also be a slot structure, which may be an annular slot etc.

In summary, this embodiment provides another structure of the connection member 130, features of simple structure and easy manufacturing are also possessed.

Sixth Device Embodiment

As shown in FIG. 1, this embodiment provides an electronic device, comprising:

a first body 110;

a second body 120; and a connection member 130 through which the first body 110 is connected with the second body 120; the connection member 130 comprising a rotary connection part for supporting the first body 110 to rotate around an axis line of the rotary connection part and an extensible connection part for supporting the first body 110 to be close to or away from the second body 120.

The connection member 130 comprises an extensible rotary shaft;

the extensible rotary shaft comprises at least N sleeves; N being an integer not less than 2;

an outer diameter of an n-th sleeve is not greater than an inner diameter of an (n+1)-th sleeve; the n-th sleeve can be located within the (n+1)-th sleeve each; n being an integer not less than 1 but less than N;

when a distance between the first body and the second body increases, at least a portion of an m-th sleeve is located outside an (m+1)-th sleeve; m being an integer not less than 1 but less than N.

A damping member is provided at a position where the connection member 130 contacts the first body 110;

the damping member is for maintaining a relative stabilization of the first body 110 and the second body 120 when an external force applied to the connection member 130 is removed.

Since the first body 110 has certain mass, when the electronic device is tilted relative to the ground, if the electronic device is not provided with the damping member, the first body 110 may automatically rotate around the second body 120 under the influence of gravity. Therefore, the damping member is provided in this embodiment to prevent the automatic rotation of the first body 110, the damping member makes the first body 110 be operative to maintain stable under the influence of gravity.

The damping member may comprise a rough contact surface between the connection member 130 and the first body 110; a strong frictional force can be produced on the rough contact surface. Of course, this embodiment requires that the frictional force is greater than a component that enables the first body 110 to automatically rotate in the weight of the first body 110.

Of course, the damping member may further comprise other damping members provided at a surface of the connection member 130, such as retractable latch teeth; a groove for containing the latch teeth may be further provided on the second body 120; the connection member 130 rotates under the action of an external force, the latch teeth remain a compressed state during the rotation, but after the rotation is stopped, a compression amount of the compressed state of the latch teeth reduces, and at least a portion of the latch teeth is located within the groove, so that stable maintaining of the position of the first body 110 can be achieved.

Another example, the damping member may be an arrangement like a shim or washer that increases friction between the connection member 130 and the second body 120.

Of course, there may be many specific structures of the damping member, in short, any arrangements that can prevent the first body 110 from automatically rotating under the influence of gravity can be used as the damping member described in this embodiment, no more illustration here.

The electronic device according to this embodiment, by introducing the damping member, can maintain stability of the first body 110, a feature of simple and compact structure is possessed.

Seventh Device Embodiment

As shown in FIG. 1, this embodiment provides an electronic device, comprising:

a first body 110;

a second body 120; and a connection member 130 through which the first body 110 is connected with the second body 120; the connection member 130 comprising a rotary connection part for supporting the first body 110 to rotate around an axis line of the rotary connection part and an extensible connection part for supporting the first body 110 to be close to or away from the second body 120.

The connection member 130 comprises an extensible rotary shaft;

the extensible rotary shaft comprises at least N sleeves; N being an integer not less than 2;

an outer diameter of an n-th sleeve is not greater than an inner diameter of an (n+1)-th sleeve; the n-th sleeve can be located within the (n+1)-th sleeve each; n being an integer not less than 1 but less than N;

when a distance between the first body and the second body increases, at least a portion of an m-th sleeve is located outside an (m+1)-th sleeve; m being an integer not less than 1 but less than N.

Figure 9:
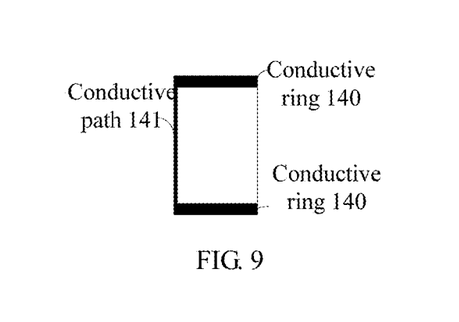
FIG. 9 is a structural schematic diagram of the sleeve according to an embodiment of the present application.

As shown in FIG. 9, each of the sleeves comprises two conductive rings 140 and a conductive path 141 thereon; the two conductive rings 140 are located at two ends of the sleeve; the conductive path 141 connects the two conductive rings;

the conductive rings 140 and the conductive path 141 all are for transmitting electrical signals between the first body 101 and the second body 102.

This embodiment adopts the arrangement of the conductive rings 140 and the conductive path 141 to implement transmission of electrical signals, in this way, the problem of interrupt of electric connection caused by that cable is apt to be frazzled when adopting the cable manner to communicate electrical signals within the sleeves can be avoided.

In a specific implementation, side walls of the sleeves where the conductive rings reside may all be made from conductive material. The conductive rings may be constituted by only a portion of the side walls of the sleeves where they reside, in which case, the conductive ring that is close to the first body 110 in one of the sleeves should be at least partially placed at an outer side wall of the sleeve; the conductive ring that is close to the second body 120 in one of the sleeves should be at least partially placed at an inner side wall of the sleeve.

The outer side wall is the side wall that can be seen when the distance between the first body 110 and the second body 120 increases.

In summary, this embodiment provides an electric connection with a longer life and fewer conductive failures, features of simple structure and stable conductivity are possessed.

It should be noted that, in a specific implementation, in order to further stabilize conductivity, multiple conductive paths and more conductive rings may be provided, to avoid the problem of interrupt of electrical signals when a conductive ring or a conductive path has a failure.

Eighth Device Embodiment

As shown in FIG. 1, this embodiment provides an electronic device, comprising:

a first body 110;

a second body 120; and a connection member 130 through which the first body 110 is connected with the second body 120; the connection member 130 comprising a rotary connection part for supporting the first body 110 to rotate around an axis line of the rotary connection part and an extensible connection part for supporting the first body 110 to be close to or away from the second body 120.

As shown in FIG. 8, an image acquisition unit 150 is provided on the first body 110;

a display unit 160 is provided on the second body 120.

Specific structure of the image acquisition unit 150 adopted in this embodiment may comprise an arrangement like a camera. The image acquisition unit 150 may be used for acquiring an image and/or a video.

The display unit 160 may comprise various display screens like an LCD display, an electronic ink display, or an OLED Display. The display unit 160 may be used for displaying images and/or characters. The display unit 160 described in this embodiment may be a display interactive unit 160, that is, a sensing unit may be set overlapped at the position where the display screen resides, in combination with information displayed by the display screen, it is possible to acquire a touch operation or a floating touch operation.

In summary, the electronic device described in this embodiment can be used for image acquisition and information display. The electronic device described in this embodiment may be an arrangement like a mobile phone etc.

Figure 10:
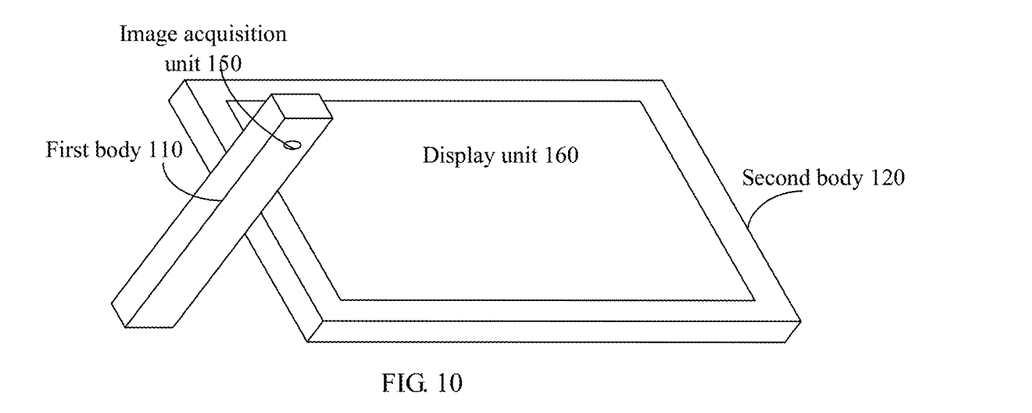
FIG. 10 is a seventh structural schematic diagram of the electronic device according to an embodiment of the present application.

As shown in FIG. 8, the image acquisition unit 150 is located at a non-neutral position of the first body 110, in this way, it is possible to perform a supportive acquisition after rotating the first body 110 and the second body 120 to a certain angle, like what is shown in FIG. 10 in particular.

Ninth Device Embodiment

As shown in FIG. 1, this embodiment provides an electronic device, comprising:

a first body 110;

a second body 120; and a connection member 130 through which the first body 110 is connected with the second body 120; the connection member 130 comprising a rotary connection part for supporting the first body 110 to rotate around an axis line of the rotary connection part and an extensible connection part for supporting the first body 110 to be close to or away from the second body 120.

The electronic device further comprises a control unit;

the control unit is for controlling a gesture or movement state of the connection member 130, so as to control a position of the first body 110 and/or that of the second body 120.

The control unit may comprise a drive part and a control part; the control part may be used for outputting a drive instruction to the drive part; the drive part may be used for applying an associated drive force to the connection member according to the drive instruction, to control the rotation and/or extension of the connection member 130, thereby control the gesture and/or motion state of the connection member 130, thus flexibly change the position of the first body 110 and that of the second body 120.

The control part may comprise multiple types of controller or control circuit; the controller may comprise arrangements like a central processing unit CPU, a microprocessor MCU, a digital signal processor DSP, or a programmable array PLC (Programmable Logic Controller). The control circuit may comprise arrangements like ASIC (Application Specific Integrated Circuit) etc.

The drive part may comprise multiple types of drive arrangements, like a rotary motor and a linear motor; the rotary motor may be used for driving the rotation of the connection member 130, the linear may be used for applying a force for extending the connection member 130. The rotary motor and the linear motor both may be drive arrangements with a compact dimension like a stepping motor.

This embodiment provides an electronic device, operative to make the connection member 130 be deformed and/or moved due to an internal drive of the electronic device, in the absence of an external force, thereby intelligently changing positions of various parts of the electronic device, improving intelligence of the electronic device and use satisfaction for the user.

Tenth Device Embodiment

As shown in FIG. 1, this embodiment provides an electronic device, comprising:

a first body 110;

a second body 120; and a connection member 130 through which the first body 110 is connected with the second body 120; the connection member 130 comprising a rotary connection part for supporting the first body 110 to rotate around an axis line of the rotary connection part and an extensible connection part for supporting the first body 110 to be close to or away from the second body 120.

The electronic device further comprises a control unit;

the control unit is for controlling a gesture or movement state of the connection member 130, so as to control a position of the first body and/or that of the second body.

The electronic device further comprises:

a detection unit for detecting the gesture or movement state of the connection member 130;

the control unit is for controlling the electronic device to perform a functional operation corresponding to the gesture or movement state of the connection member 130.

The detection unit may comprise a variety of sensing arrangements, like an infrared sensor that emits infrared light and receives infrared reflected signals. The infrared sensor may be provided at a connecting end surface of the second body 120 and the connection member 130 or at a connecting end surface of the first body 110 and the connection member 130. When the first body 110 and the second body 120 rotate in a plane parallel to the end surface of the second body 120, a butt area between the first body and the second body will change, in this case, it may block the infrared light emitted by the infrared sensor or make the infrared light be emitted to a direction away from the electronic device, so the infrared sensor can determine the positional relationship between the first body 110 and the second body 120 according to signal energy or energy density of reflected signals of the infrared light.

Of course, the detection unit 120 may be arrangements like a photosensitive arrangement provided at the connecting end surface between the second body 120 and the connection member 130, like a resistor arrangement etc., the gesture or motion state of the connection member 130 can be determined based on different resistances of the photosensitive resistor in a blocked state and a non-blocked state.

In this embodiment, the control unit also controls the electronic device to perform a functional operation corresponding to the gesture or movement state of the connection member 130. Specifically, for example, the control unit determines that the current connection member 130 is in a gesture of making selfie, the control unit will control the electronic device to turn on the image acquisition unit, to facilitate making selfie based on a user instruction, in this way, there is no need for the user to additionally trigger an instruction to turn on the image acquisition unit, obviously intelligence of the electronic device is improved, user operations are further simplified, use satisfaction of the user is enhanced.

Another example, the user uses the electronic device described in this embodiment to acquire a video; the connection member 130 is further used as a support stick for acquiring a video by being stretched and rotated. Meanwhile, the user uses the display unit on the second body 120 to play the acquired video concurrently. For example, in a match site or a star meeting site, the user stretches his/her hand and the connection member 130 very long to acquire image and voice of a player or a star that he/she is interested, when the connection member 130 extends very long, the user may be far away from the second body 120, since the display unit does not display the acquired image in full-screen, viewing experience of the user will be poor, but in this case it is difficult for the user to control to zoom in. By using the electronic device described in this embodiment, the control unit will control scaling or the like of the displayed image according to the rotation angle and/or extended length of the connection member 130. Of course, the control unit may be further used for controlling an audio play volume or the like of the electronic device according to the rotation angle and/or extended length of the connection member 130.

Eleventh Device Embodiment

As shown in FIG. 1, this embodiment provides an electronic device, comprising:

a first body 110;

a second body 120; and a connection member 130 through which the first body 110 is connected with the second body 120; the connection member 130 comprising a rotary connection part for supporting the first body 110 to rotate around an axis line of the rotary connection part and an extensible connection part for supporting the first body 110 to be close to or away from the second body 120.

The electronic device further comprises an elastic member formed with a pre-compression;

the pre-compression is configured to provide a drive force for the first body 110 to be away from the second body 120, so that the distance between the first body 110 and the second body 120 is operative to change between a first distance and a second distance; the first distance being less than the second distance.

The elastic member in this embodiment may comprise arrangements like a spring or elastic plastics. The elastic member in this embodiment will be compressed or extended under the action of an external force, but it may restore to its natural state after the external force is removed, the natural state here refers to a non-compressed or a non-extended state, for example a spring returns to its original length.

The pre-compression may be applied by other arrangements in the electronic device to the elastic member. Specifically, for example, the electronic device further comprises a first magnetic member and a second magnetic member. The first magnetic member is connected with the first body 110; the second magnetic member is connected with the second body 120; the elastic member is located between the first magnetic member and the second magnetic member. By changing a current manner of at least one of the first magnetic member and the second magnetic member, a magnetic force between the first magnetic member and the second magnetic member is changed. When the magnetic force is enough to maintain the pre-compression of the elastic member, the elastic member cannot provide a drive force to stretch the first body 110. When the magnetic force reduces to insufficient to maintain the pre-compression of the elastic member, the elastic member can provide the drive force to stretch the first body 110 and the second body 120.

The electronic device in this embodiment, by providing the elastic member, can provide the drive force to change the distance the first body 110 and the second body 120, which facilitates automatic change of the distance between the first body 110 and the second body 120.

Twelfth Device Embodiment

As shown in FIG. 1, this embodiment provides an electronic device, comprising:

a first body 110;

a second body 120; and a connection member 130 through which the first body 110 is connected with the second body 120; the connection member 130 comprising a rotary connection part for supporting the first body 110 to rotate around an axis line of the rotary connection part and an extensible connection part for supporting the first body 110 to be close to or away from the second body 120.

The electronic device further comprises an elastic member;

the elastic member is formed with a pre-compression;

the pre-compression is for providing a drive force for the first body 110 to be away from the second body 120, so that the distance between the first body 110 the second body 120 changes between a first distance and a second distance; the first distance being less than the second distance.

Figure 11:
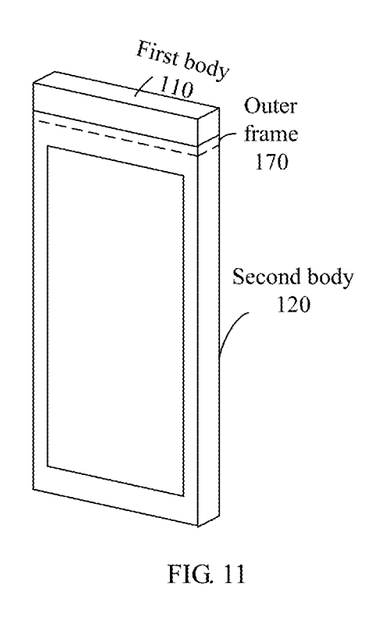
FIG. 11 is an eighth structural schematic diagram of the electronic device according to an embodiment of the present application.

As shown in FIG. 11, a circumferential edge of the end surface of the second body 120 forms an outer frame 170 along a direction away from the end surface; a height of the outer frame 170 is not less than that of the elastic member after the pre-compression is formed.

In this embodiment, setting of the outer frame 170 can just block the elastic member. In FIG. 11, the position where a dotted line resides in the second body 120 indicates the position where the end surface of the second body 120, the part above the dotted line 170 is the outer frame.

As shown in FIG. 11, normally, a portion of the first body 110 that is close to the second body 120 may be located in the outer frame 170. The area and shape of the portion of the first body portion 110 that is close to the second body 120 may be adaptive to the size and shape of an accommodating space provided by the outer frame 170, in this way, the elastic member can be better blocked.

Since the first body 110 and the second body 120 are two separate bodies, if connection is implemented only by the connection member, it may not be able to achieve a seamless joint, the outer frame 170 is introduced in this embodiment to block a slot between the first body 110 and the second body 120, by introducing the outer frame 170, a portion of the first body 110 may be located within the outer frame 170, thus achieving the effect of blocking the gap.

In a particular implementation, the elastic member may be a spring or hollow elastic plastics, the spring or the hollow elastic plastics may be provided at a periphery of the connection member 130, through the pre-compression, it may comprise a minimum extended length of connecting member 130. Further, the elastic member provided in the periphery of the connection member 130 may have only one end fixed with the second body 120, and the other end is a free end. Such design can avoid the elastic member from obstructing the first body 110 in being away from the second body 120. Meanwhile, the length of the elastic member in the natural state may not be greater than the height of the outer frame 170, which avoids inconvenient usage and aesthetic problems caused by that the elastic member extends outside the outer frame 170.

In the several embodiments provided by present application, it should be understood that the device/apparatus and methods disclosed therein may also be implemented by other manners. The above described device/apparatus embodiments are merely illustrative, for example, the unit division is only a logical function division, there may be other division manners in practical implementation, such as: a plurality of units or components may be combined or may be integrated into another system, or some features may be omitted or not executed. In addition, coupling, or direct coupling, or communicative connection between the shown or discussed respective components may be achieved through some interfaces, indirect coupling or communicative connection between devices or units may be electrical, mechanical, or other forms.

Units described above as separate members may be or may not be physically separated, components showed as units may be or may not be physical units; they may be located at one place or distributed to a plurality of network cells; it is possible to select some or all of the units therein to achieve the purpose of solutions in the embodiments according to the actual needs.

Further, respective functional units in the embodiments of the present application may be all integrated in one processing unit and may also be separated as one unit each, or two or more units may also be integrated in one unit; the aforesaid integrated unit may be implemented in the form of hardware or in the form of hardware plus software functional unit.

As will be appreciated by those of ordinary skill in the art: all or part of the steps of the above method embodiments may be completed by instructing relevant hardware through programs, these programs may be stored in a computer readable storage medium, the steps comprised in the above method embodiments will be executed when the programs are executed; the aforesaid storage medium comprises various mediums operative to store program codes like a mobile storage device, a Read Only Memory (ROM), a magnetic disk, or an optical disk.

The above described are merely specific implementations of the present application, however, the protection scope of the present application is limited thereto, modifications or replacements that are easily conceivable for those skilled in the art within the technique range disclosed in the present application should all fall into the protection scope of the present application. Therefore, the protection scope of the present application should be based on what is claimed in the claims.

The invention claimed is:

1. An electronic device, comprising:
a first body;
a second body; and
a connection member through which the first body is connected with the second body; the connection member comprising a rotary connection part for supporting the first body to rotate around an axis line of the rotary connection part and an extensible connection part for supporting the first body to be close to or away from the second body, wherein the connection member comprises a first flexible shaft that is operative, through deformation, to enable the first body to rotate in a first plane parallel to an end surface of the second body, and change a distance between the first body and the second body.

2. The electronic device of claim 1, wherein the connection member comprises a T-shaped rotary shaft that includes the first flexible shaft perpendicular to an end surface of the second body and a first rotary shaft parallel to the end surface of the second body; and the first rotary shaft is operative to enable the first body to rotate in a second plane perpendicular to the end surface of the second body.

3. The electronic device of claim 1, wherein the connection member comprises an I-shaped rotary shaft that includes the first flexible shaft perpendicular to an end surface of the second body, and a second rotary shaft and a third rotary shaft parallel to the end surface of the second body; the second rotary shaft is movably connected with the first body; the third rotary shaft is movably connected with the second body; the second rotary shaft is operative to enable the first body to rotate in a second plane; the third rotary shaft is operative to enable the second body to rotate in the second plane; and the first plane is perpendicular to the second plane.

4. The electronic device of claim 1, wherein an image acquisition unit is provided on the first body and a display unit is provided on the second body.

5. The electronic device of claim 1, further comprising a control unit for controlling a gesture or movement state of the connection member, so as to control a position of the first body and/or that of the second body.

6. The electronic device of claim 5, further comprising a detection unit for detecting the gesture or movement state of the connection member and the control unit is further configured to control the electronic device to perform a functional operation corresponding to the gesture or movement state of the connection member.

7. The electronic device as claimed in claim 1, further comprising an elastic member formed with a pre-compression is configured to provide a drive force for the first body to be away from the second body, so that the distance between the first body and the second body is operative to change between a first distance and a second distance; the first distance being less than the second distance.

8. The electronic device as claimed in claim 7, wherein circumferential edge of the end surface of the second body forms an outer frame along a direction away from the end surface; a height of the outer frame is not less than that of the elastic member after the pre-compression is formed.

9. An electronic device, comprising:
a first body;
a second body; and
a connection member through which the first body is connected with the second body; the connection member comprising a rotary connection part for supporting the first body to rotate around an axis line of the rotary connection part and an extensible connection part for supporting the first body to be close to or away from the second body, wherein
the connection member comprises an extensible rotary shaft; the extensible rotary shaft comprises at least N sleeves; N being an integer not less than 2; an outer diameter of an n-th sleeve is not greater than an inner diameter of an (n+1)-th sleeve; the n-th sleeve is located within the (n+1)-th sleeve; n being an integer not less than 1 but less than N; when a distance between the first body and the second body increases, at least a portion of an m-th sleeve is located outside an (m+1)-th sleeve; m being an integer not less than 1 but less than N.

10. The electronic device of claim 9, wherein a damping member is provided at a position where the connection member contacts the first body and the damping member is configured to maintain a relative stabilization of the first body and the second body when an external force applied to the connection member is removed.

11. The electronic device of claim 9, wherein each of the sleeves comprises two conductive rings and a conductive path thereon; the two conductive rings are located at the ends of the sleeve; the conductive path connects the two conductive rings; the conductive rings and the conductive path all are configured to transmit electrical signals between the first body and the second body.

12. The electronic device as claimed in claim 9, wherein an image acquisition unit is provided on the first body; and a display unit is provided on the second body.

13. The electronic device as claimed in claim 9, further comprising a control unit for controlling a gesture or movement state of the connection member, so as to control a position of the first body and/or that of the second body.

14. The electronic device as claimed in claim 13, further comprising a detection unit for detecting the gesture or movement state of the connection member; the control unit is further configured to control the electronic device to perform a functional operation corresponding to the gesture or movement state of the connection member.

15. The electronic device as claimed in claim 9, further comprising an elastic member formed with a pre-compression; the pre-compression is configured to provide a drive force for the first body to be away from the second body, so that the distance between the first body and the second body is operative to change between a first distance and a second distance; the first distance being less than the second distance.

16. The electronic device as claimed in claim 15, wherein a circumferential edge of the end surface of the second body forms an outer frame along a direction away from the end surface; a height of the outer frame is not less than that of the elastic member after the pre-compression is formed.

* * * * *